US010197182B2

(12) United States Patent
Ramp et al.

(10) Patent No.: US 10,197,182 B2
(45) Date of Patent: Feb. 5, 2019

(54) CABLE ACTUATOR GUIDE FOR LIQUID DISPENSER

(71) Applicant: Diversey, Inc., Charlotte, NC (US)

(72) Inventors: Joachim Gerrit Ramp, Boskoop (NL); Michel Schumacher, Boxtel (NL)

(73) Assignee: Diversey, Inc., Charlotte, NC (US)

( * ) Notice: Subject to any disclaimer, the term of this patent is extended or adjusted under 35 U.S.C. 154(b) by 0 days.

(21) Appl. No.: 15/378,746

(22) Filed: Dec. 14, 2016

(65) Prior Publication Data

US 2017/0167628 A1 Jun. 15, 2017

Related U.S. Application Data

(60) Provisional application No. 62/267,320, filed on Dec. 15, 2015.

(51) Int. Cl.
*F16K 31/46* (2006.01)
*B05B 12/00* (2018.01)

(52) U.S. Cl.
CPC .......... *F16K 31/465* (2013.01); *B05B 12/002* (2013.01)

(58) Field of Classification Search
CPC ............................ F16K 31/465; B05B 12/002
USPC ....... 222/529, 173, 174, 391, 473, 474, 590; 74/217 B, 501 R, 502.6
See application file for complete search history.

(56) References Cited

U.S. PATENT DOCUMENTS

| | | | | |
|---|---|---|---|---|
| 3,201,090 | A | 8/1965 | Jones | |
| 4,156,373 | A * | 5/1979 | Juy | B62M 25/02 74/502.6 |
| 4,262,822 | A * | 4/1981 | Corte | B05C 17/0123 222/174 |
| 4,306,871 | A * | 12/1981 | Nagano | B62M 9/127 474/82 |
| 4,325,269 | A | 4/1982 | Nagano | |
| 4,796,865 | A * | 1/1989 | Marchetti | B65H 57/12 254/134.3 FT |
| 4,932,565 | A * | 6/1990 | Paradiso | B05C 17/00516 222/174 |
| 6,299,035 | B1 | 10/2001 | Dalhart | |
| 7,963,304 | B2 | 6/2011 | Bertucci et al. | |
| 2012/0247263 | A1* | 10/2012 | Chubbuck | B62J 99/00 74/502.6 |

* cited by examiner

*Primary Examiner* — Vishal Pancholi
(74) *Attorney, Agent, or Firm* — Andrew R. Aranda

(57) ABSTRACT

A cable guide for improving performance and longevity of a dispenser actuator for remotely operating a dispensing unit with a flexible cable connected between a valve of the dispensing unit and the actuator. The cable opens or closes the valve by manipulating the actuator adjacent the discharge end of the tube. The guide is positioned within the actuator in physical contact with the cable. The guide may comprise a thin arched body extending upward from a leading edge to a peak and downward to a trailing edge. The cable can slide over the guide as the actuator operates the valve. The guide prevents the cable from bending with a small bend radius, e.g., smaller than five or ten or even twenty times a diameter of the cable as the actuator operates the valve.

11 Claims, 5 Drawing Sheets

CABLE ACTUATOR GUIDE FOR LIQUID DISPENSER

CROSS-REFERENCE TO RELATED APPLICATIONS

The present application claims priority to U.S. Provisional Patent Application Ser. No. 62/267,320, filed Dec. 15, 2015.

BACKGROUND OF THE INVENTION

The present invention is in the technical field of cable guides. More particularly, the present invention is in the technical field of liquid dispenser actuators employing said cable guides.

Certain lever-actuated mechanisms make use of flexible, elongated cables to transfer the point of application of a mechanical force from the actuated lever to a remote location. For example, some hand actuated brake or shifter levers on bicycles and motor bikes take advantage of this transfer of mechanical force to permit riders to apply brakes or shift gears at different parts of the cycle by actuating the levers on the handlebars. Another example of a hand actuator that uses a flexible cable to transfer mechanical force is a liquid dispenser of the type disclosed in U.S. Pat. Nos. 6,299,035 and 7,516,763, the disclosures of which are expressly incorporated by reference herein.

Ideally, flexible cable actuators are designed so that the motion of the cable is largely linear or without significant bends. That is, as the lever actuator is actuated to pull the flexible cable, the cable should be pulled out of its ferrule or housing in generally the same direction as the cable is oriented prior to actuating the lever. Keeping the cable straight and avoiding sharp bends during actuation can improve product longevity, avoiding kinks in the cable to maintain optimal performance, and to reduce the likelihood that the cable will break or fray with continued use.

Unfortunately, design or material constraints may force designers to mount the flexible cable in suboptimal arrangements. For example, in the Prior Art embodiments illustrated in FIGS. 5A-5B, a flexible cable 110 is used in the exemplary actuator 100 to selectively control the flow of liquid from a remote dispensing unit 120. The Prior Art actuator 100 is attached towards a discharge end of a dispensing tube 112, through which a mixture of water and cleaning chemical is dispensed. The appropriate mixture of water and cleaning chemical is provided by the dispensing unit 120 through the use of known proportioning systems such as eductors, aspirators or proportioners. A water shutoff valve 122 is connected to the dispensing unit 120 to control the flow of liquid through the inlet of dispensing tube 112. In order to control the shutoff valve 122 from the discharge end of the dispensing tube 112, the actuator 100 makes use of a flexible cable 110 that is coupled between the actuator 100 and the shutoff valve 122.

The actuator 100 includes a pivotally attached lever 114 that triggers the flow of liquid through the dispensing tube 112. The flexible cable 110 includes a ferrule or housing 116 that is secured to an upstream portion of actuator 100. Meanwhile, the downstream end of flexible cable 110 is secured to the lever 114 such that whenever the lever 114 is actuated between the non-dispensing condition in FIG. 5A and the dispensing condition in FIG. 5B, the flexible cable 110 is pulled through the housing 116 and moves the valve 112 in the dispensing unit 120 into an open, flowing position.

Unfortunately, with exemplary Prior Art actuators 100 of the type shown in FIGS. 5A-5B, actuating the lever 114 (FIG. 5B) to start the flow of liquid through dispensing tube 112 forces the flexible cable 110 to bend at an extreme angle $\alpha$ relative to its original, non-dispensing position (FIG. 5A). Bending over such an extreme angle $\alpha$ does not in itself pose a fatigue problem for the flexible cable 110 as long as the cable 110 is bent over a sufficiently large bend radius. A good rule of thumb for bending steel cable is that the bend radius should be kept to larger than 10 times the cable diameter and preferably over 20 times the cable diameter. In the present example, however, the flexible cable 110 is bent over a hard, sharp edge of the actuator 100 as it extends to the dispensing position (FIG. 5B). In the Prior Art actuator 100, the flexible cable 110 is bent over a small bend radius that is really only on the order of a few cable diameters large. Repeated actuations, and hence repeated over-bending and over-flexing of the flexible cable 110 will ultimately lead to premature fraying, breaking, and failure of the flexible cable 110 and the actuator 100. Water regulatory agencies may require a certain number of actuations before failing. Furthermore, the default failsafe mode should be that the water valve shuts in the event of any failure. However, with the Prior Art actuators, the frayed cable often gets stuck and does not retract completely into the cable housing 116, thereby leaving the water valve 112 open. Therefore, there is a need in the industry for a solution that mitigates the problem of flexible cable failures present in exemplary Prior Art actuators 100 of the type shown in FIGS. 5A-5B.

SUMMARY OF THE INVENTION

One or more embodiments of the present invention relate to a guide for flexible cables used in liquid dispensing actuators comprising a thin arched body extending upward from a leading edge to a peak and downward to a trailing edge, a planar ramped section extending from the leading edge towards the peak of the arched body, an arcuate deflecting section extending from the end of the planar ramped section and terminating at the trailing edge, and a recessed cable channel forming a trench protruding below the planar ramped section in a direction opposite the peak, the cable channel beginning at the leading edge and extending towards but terminating before the trailing edge. In one embodiment, the thin arched body is fabricated from sheet metal.

Another aspect of the present invention relates to a dispenser actuator for remotely operating a dispensing unit having a proportioner for combining and dispensing a plurality of liquids in a selected proportion and a valve for passing and cutting off at least one of said liquids, the actuator comprising a dispensing tube having an inlet end and a discharge end, said tube adapted to be in liquid communication with the dispensing unit at the inlet end of the dispensing tube, an actuator disposed adjacent the discharge end of said dispensing tube, a flexible elongated member operably connected between the valve of the dispensing unit and the actuator such that the valve is opened and closed by manipulating the actuator adjacent the discharge end of the tube, and a guide for controlling a path of travel of the flexible elongated member as the actuator is manipulated to operate the valve in the dispensing unit. In one embodiment, the guide is positioned within the actuator in physical contact with the flexible elongated member. In one embodiment, the guide may comprise a thin arched body extending upward from a leading edge to a peak and downward to a trailing edge, a ramped section extending from the leading edge towards the peak of the arched body and a deflecting section extending from the end of the ramped section and terminating downward at the trailing edge. The flexible elongated member can slide over the deflecting section of the guide as the actuator is manipulated to operate the valve in the dispensing unit. In one or more embodiments, the guide prevents the flexible elongated member from bending with a small bend radius as the actuator is manipulated to operate the valve in the dispensing unit. In one or more embodiments, the guide prevents the flexible elongated member from bending with a bend radius smaller than five or ten or even twenty times a diameter of the flexible elongated member as the actuator is manipulated to operate the valve in the dispensing unit.

Embodiments of the cable guide disclosed herein may be used to retrofit dispenser actuators for remotely operating a dispensing unit having a proportioner for combining and dispensing a plurality of liquids in a selected proportion and a valve for passing and cutting off at least one of said liquids. The retrofitting method may comprise detaching a flexible elongated member operably connected between the valve of the dispensing unit from a lever of the actuator. In such systems, the flexible elongated member is configured to open and close the valve by manipulating the lever of the actuator adjacent the discharge end of the tube. After detaching the flexible elongated member from the lever, the retrofitting process continues by inserting an arched guide for controlling a path of travel of the flexible elongated member as the actuator is manipulated to operate the valve in the dispensing unit. Inserting the guide comprises positioning a leading end of the guide under the detached flexible elongated member and elastically deforming a trailing end of the guide to positively engage the trailing end of the guide within an opening in the dispenser actuator. Then, the retrofitting is continued by routing the flexible elongated member over a peak of the arched guide and re-attaching the flexible elongated member to the lever of the actuator. Once inserted, the cable guide is capable of preventing the flexible elongated member from bending with a small bend radius, such as five or ten or twenty times a diameter of the flexible elongated member while manipulating the lever of the actuator to operate the valve in the dispensing unit.

DETAILED DESCRIPTION OF THE INVENTION

Figures 1, 2A, 2B, 3:
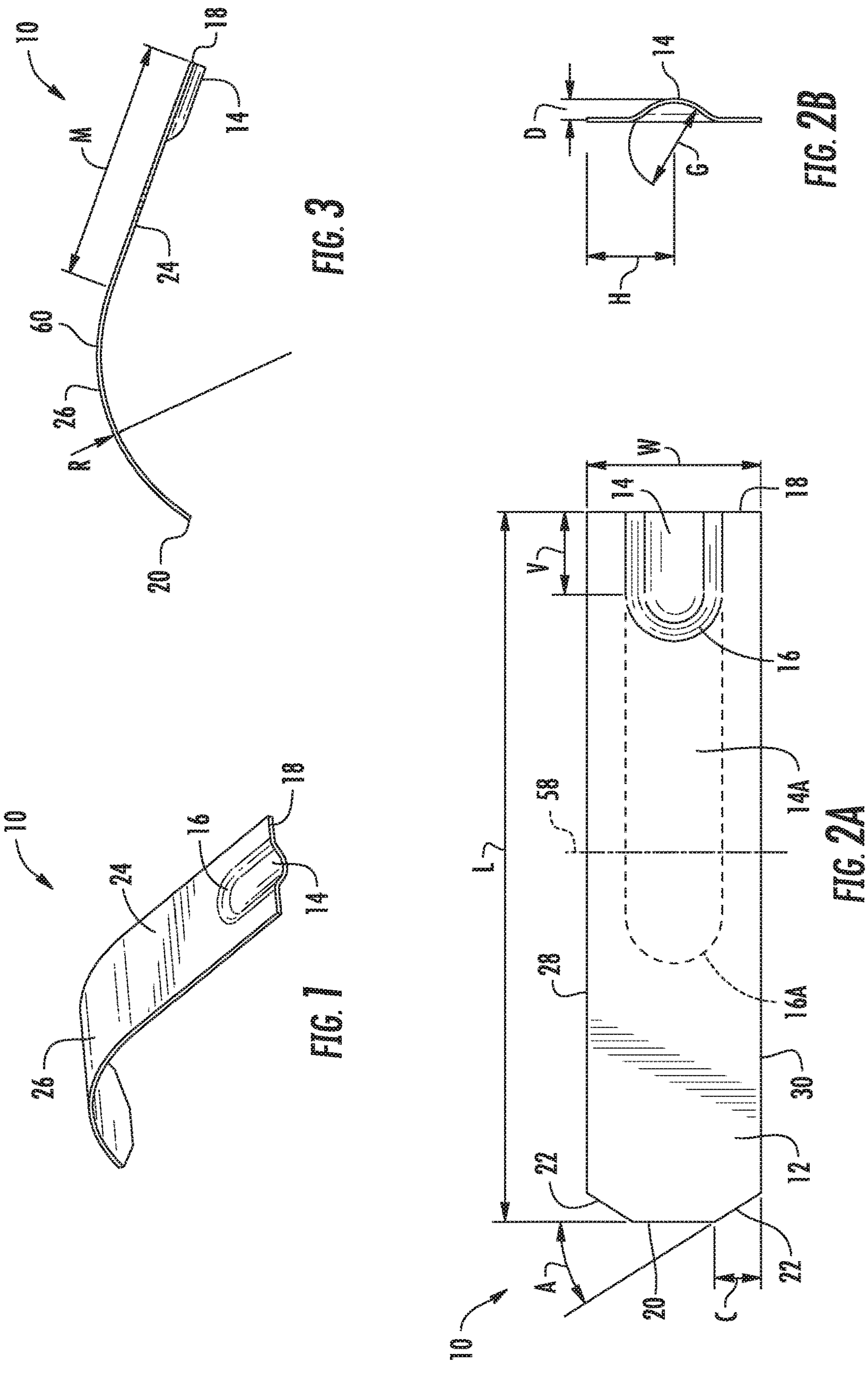
FIG. 1 is a perspective view of an embodiment of a cable guide of the present invention.
FIG. 2A is a top view of the cable guide of FIG. 1 prior to forming into a final shape.
FIG. 2B is an end view of the cable guide of FIG. 1 prior to forming into a final shape.
FIG. 3 is a side view of the cable guide of FIG. 1.
Figure 4A:
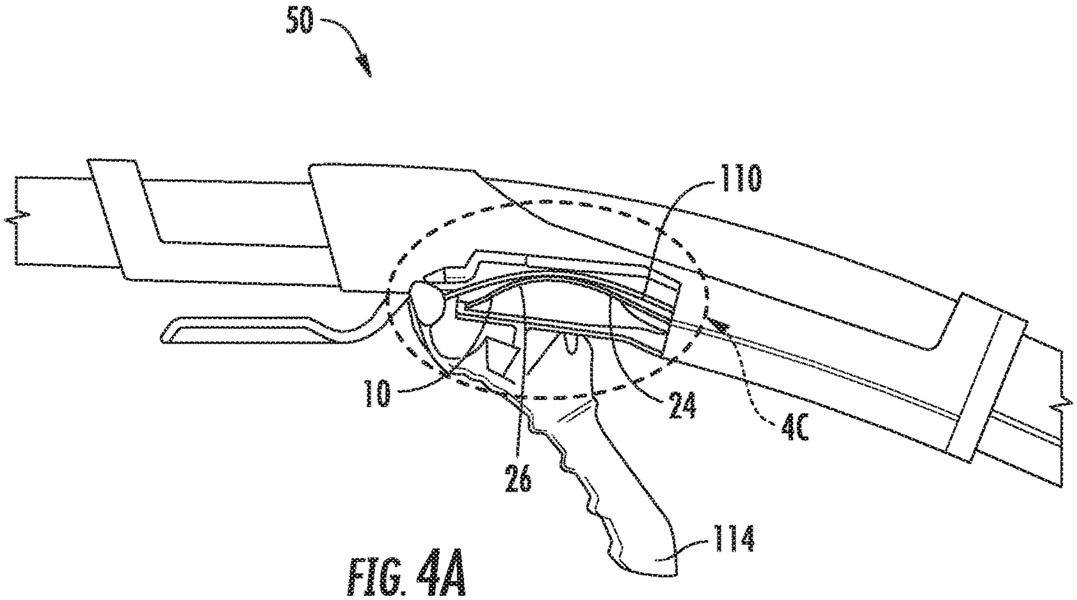
FIG. 4A is a side cutaway view of an embodiment of a cable guide of the present invention installed in a representative liquid dispenser actuator in a non-dispensing state.
Figure 4B:
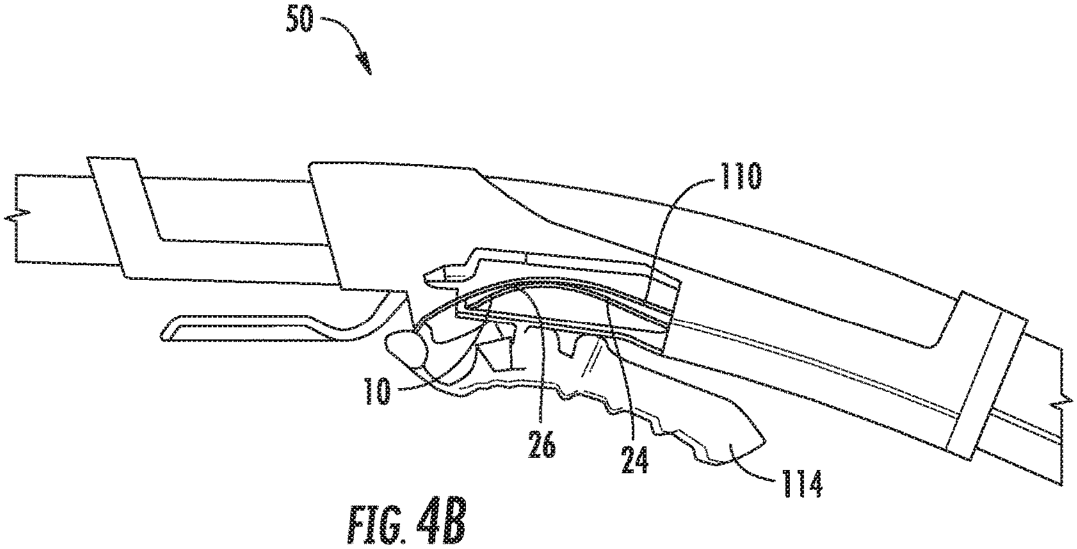
FIG. 4B is a side cutaway view of an embodiment of a cable guide of the present invention installed in a representative liquid dispenser actuator in a dispensing state.
Figure 4C:
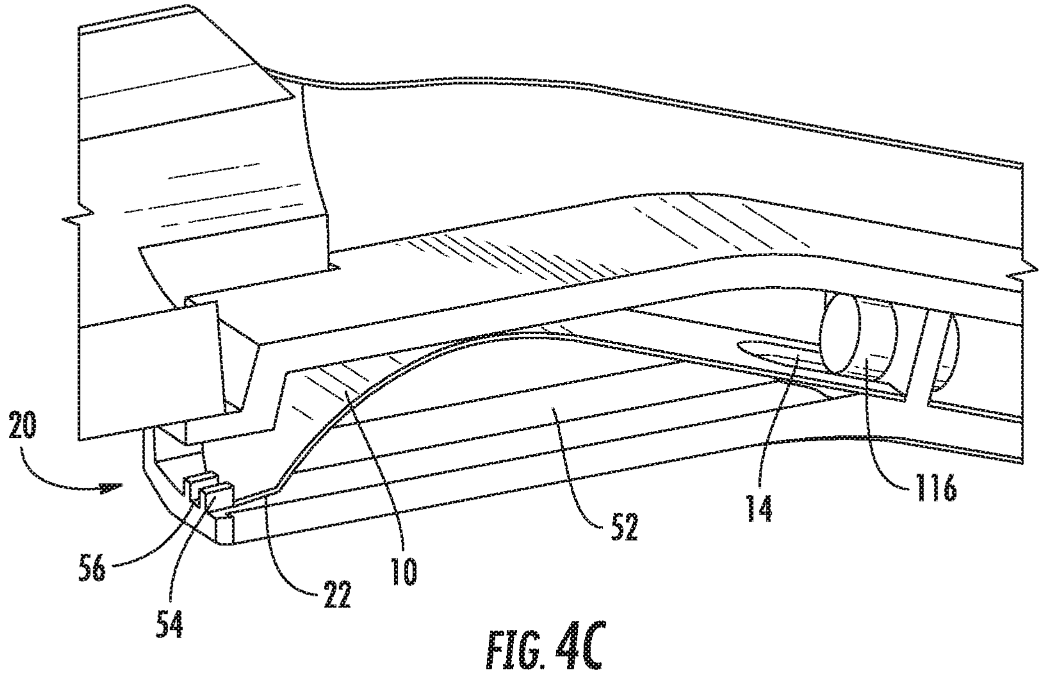
FIG. 4C is a side perspective cutaway detail of an embodiment of a cable guide of the present invention installed in a representative liquid dispenser actuator.

Referring now to the invention in more detail, FIGS. 1-3 show an exemplary cable guide 10 in various stages of manufacture for use within a liquid dispenser actuator 50 as shown in FIGS. 4A-4C. In the illustrated embodiment, the cable guide 10 includes a generally flattened, elongated construction. In one embodiment, the cable guide 10 may be formed from sheet metal, including for example, stainless steel. The stainless steel may be heat treated steel using known methods such as tempered or annealed. The tempered stainless steel may be selected from a variety of known compositions, including for example 201, 301, 304, or 410 stainless. The sheet metal may be a spring steel. Further, the sheet metal may be hardened to various hardnesses as are known, including for example ¼ hard, ½ hard, or full hard. The cable guide 10 may be constructed of other metals, including for example hardened or anodized aluminum or titanium.

In various embodiments, the cable guide 10 may be constructed from sheet metal having a thickness between about 0.2-0.4 mm, although thicker or thinner cable guides are also contemplated. As seen in FIG. 2A, the cable guide is generally formed from an elongated, rectangular blank 12 with a length L that is several times larger than the width W. In one embodiment, the length L of the rectangular blank 12 is about 55-60 mm long and the width W of the blank 12 is about 12-16 mm wide. In one embodiment of the blank 12, the length is 58 mm, the width is 14 mm, and the thickness is 0.3 mm.

Referring still to FIG. 2A, the illustrated embodiment of the cable guide 10 may be created from a rectangular blank 12 that is further processed to create a desired final shape that is non-flat. In the illustrated example shown specifically in FIGS. 1&3, the cable guide 10 is characterized by a generally arched shape, that begins at a leading end 18 with a substantially planar ramp section 24 and continues to a curved deflecting section 26 and terminates at a trailing end 20. The generally arched shape, and particularly the curved deflecting section 26 assist in changing the path along which the flexible cable 110 travels as it extends and retracts between the dispensing and non-dispensing positions shown in FIGS. 4A and 4B. The ramp section 24 extends a distance M from the leading end 18 towards the curved deflecting section 26. The distance M may be between about 25-30 mm. The curved deflecting section 26 has a radius of curvature R that is sufficient to increase the bend radius of the flexible cable 110 as it extends and retracts between the dispensing and non-dispensing positions shown in FIGS. 4A and 4B. The radius of curvature R of the deflection section 26 may be between about 20-25 mm. This radius of curvature may R be altered as space within the dispenser actuator 50 might permit, but it is certainly desirable to make the dimension R larger than five or perhaps even eight times the diameter of the flexible cable 52. In some embodiments, the radius of curvature R is larger than 10 times the diameter of the flexible cable, which may be between 1-2 mm. In one embodiment, the ramp section 24 extends a distance M of about 27 min from the leading end 18 of the cable guide 10 and the radius of curvature R of the deflecting section 26 is about 22 mm.

Figure 5A:
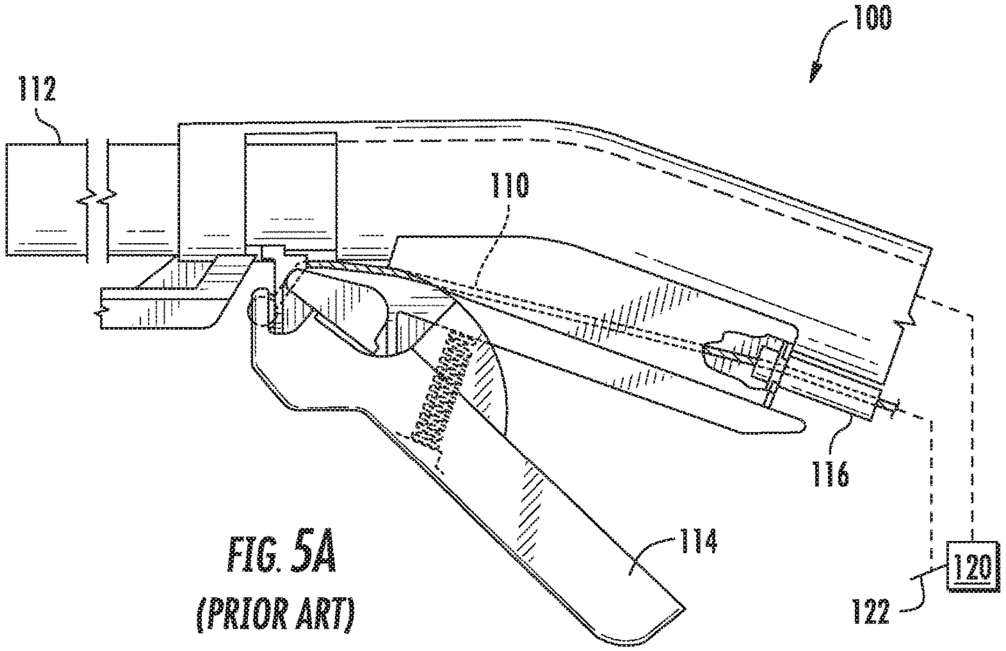
FIG. 5A (PRIOR ART)
FIG. 5A is a side cutaway view of a Prior Art liquid dispenser actuator in a non-dispensing state.
Figure 5B:
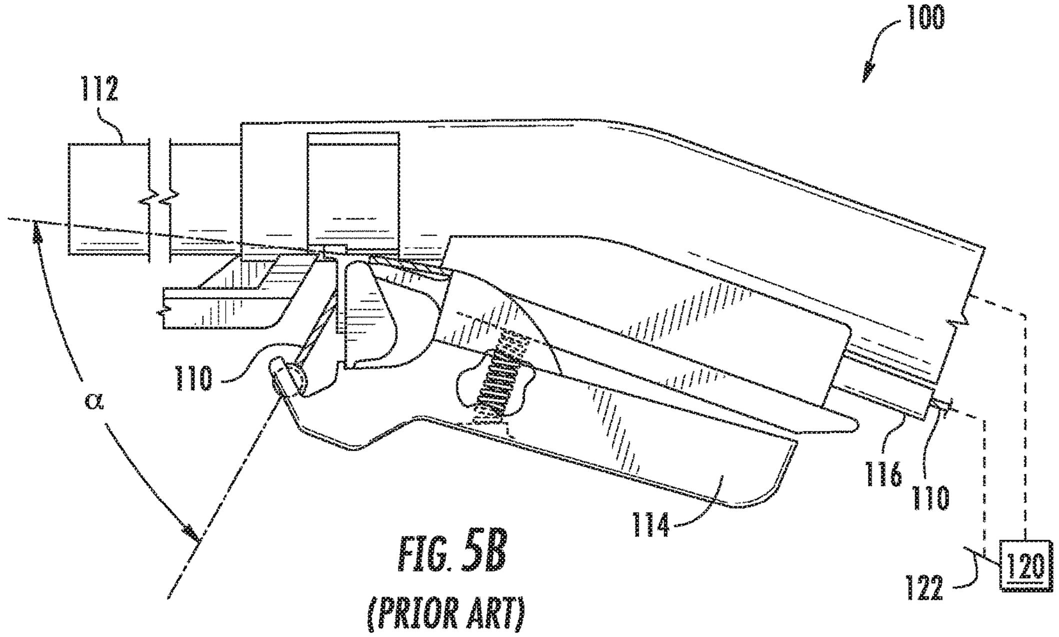
FIG. 5B (PRIOR ART)
FIG. 5B is a side cutaway view of a Prior Art liquid dispenser actuator in a dispensing state.

At a leading end 18 of the blank 12, a guide channel 14 is created by a stamping, pressing, or forming process. The guide channel 14 is a recessed valley or trench region below the surface of the ramp section 24 at the leading end 18 of the cable guide 10 that provides clearance for the cable housing 116 (see e.g., FIG. 5A) or any related hardware securing the cable housing 116 to the dispenser actuator 50. In the illustrated embodiment, the guide channel 14 is formed with a generally curved, arcuate cross section (see FIG. 2B). In this embodiment, the guide channel 14 is formed to a depth D that is between about 1-2 mm. The arcuate cross section of the guide channel follows a generally circular shape with a diameter G of between 5-9 mm. In one embodiment, the depth D is about 1.5 mm and the diameter G is about 7 mm. The depth and size of the guide channel 14 should be large enough to prevent interference with the cable housing 116 or any related hardware. Any interference that may exist because of the absence or improper sizing of the guide channel 14 may hinder the motion of the flexible cable 110 (see FIG. 4A-4B) as the flexible cable 110 extends and retracts between the dispensing and non-dispensing positions. The guide channel 14 may extend a sufficient distance V from the leading end 18 of the cable guide 10 to provide the aforementioned clearance for the housing 116 or related hardware. Depending on the type of housing 116 or hardware used, this channel distance V may be between about 5-10 mm. In one embodiment, this distance V is about 7 mm. Located at the end of this distance V from the leading end 18 of the cable guide 10 is a transition region 16, where the guide channel 14 ends and transitions from the recessed shape to a substantially planar shape exhibited by the ramp section 24 and the rest of the cable guide 10.

At the trailing end 20 of the cable guide 10 are optional two chamfers 22 that improve the fit of the cable guide 10 within the dispenser actuator 50. The chamfers 22 are cut or ground to remove material at an angle A from the trailing end 20 and at a distance C from the sides 28, 30 of the cable guide 10. In one embodiment, the angle A is about 30 degrees and the distance C is about 4 mm. In the illustrated embodiment, the chamfers 22 remove roughly one third of the trailing end 20 of the cable guide so that only the central portion of the trailing end 20 between the chamfers 22 contacts the interior of the dispenser actuator 50 as shown in FIG. 4C. As indicated above, the chamfers 22 may be included to improve fit, but may be omitted to decrease part cost and complexity if a particular implementation permits.

Figure 6:
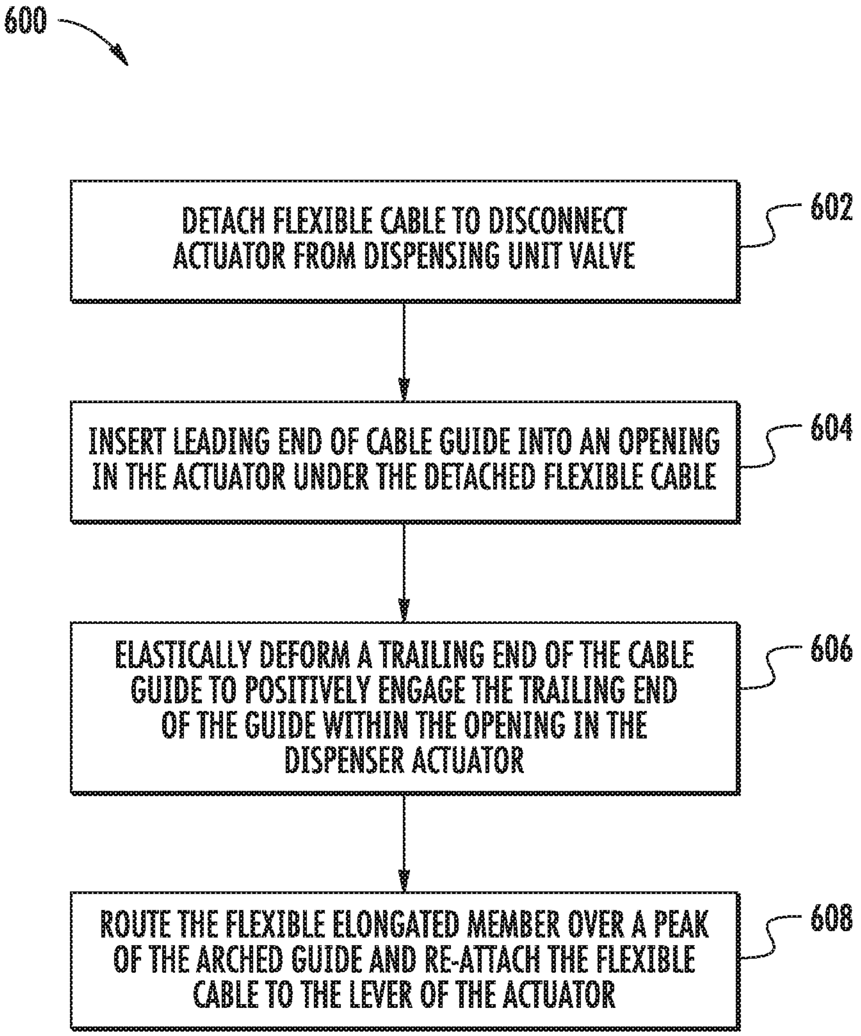
FIG. 6 lists retrofit method steps for implementing a cable guide within a representative liquid dispenser actuator according to an embodiment of the present invention.

FIG. 4C shows a rotated isometric cutaway detail view of the cavity 52 in the dispenser actuator 50 in which the cable guide 10 is placed. The flexible cable 110 is omitted from FIG. 4C for clarity. In FIG. 4C, one can see that the guide channel 14 provides the aforementioned clearance for the cable housing 116. At the opposite end of the cable guide 10, the portion of the trailing end 20 between the chamfers 22 abuts two cable blocks 54 on the dispenser actuator 50. In order to install the cable guide 10 into the cavity 52, a retrofit process 600 such as that shown in FIG. 6 may be used. In a first step 602, the flexible cable 110 may be detached from the lever 114. In a second step 604, the cable guide 10, particularly the leading end 18 is inserted over the cable blocks 54, under the flexible cable 110, and under the cable housing 116. As indicated at step 606, inserting the cable guide 10 in this manner may require elastic deformation of the cable guide 10 (i.e., bending of the trailing end 20 up and over the cable blocks 54) so material choice is indeed an important consideration. Therefore, a ductile material such as spring steel may be desirable. Lastly, at step 608, the flexible cable 110 is re-routed over the cable guide 10 and re-attached to the actuator lever 114.

In both the Prior Art actuator 100 and the improved actuator 50, the flexible cable 110 passes between these two cable blocks 54 to connect with lever 114. In the Prior Art dispenser 100, the flexible cable slides and bends over edge 56 as the lever 114 moves between the dispensing and non-dispensing positions. However, with the cable guide 10 positioned within the improved dispenser actuator 50, the flexible cable 110 is redirected up and away from edge 56 so that it avoids contact with or makes very light contact with the edge 56. Moreover, the cable guide prevents the flexible cable 110 from bending over the edge 56 and greatly increased the bend radius of the flexible cable 110 as the lever 114 moves between the dispensing and non-dispensing positions.

In the improved configuration of the dispenser actuator 50 that includes a cable guide 10, the flexible cable 110 may still pass between the cable blocks 54. Thus, the cable blocks 54 help to keep the flexible cable 110 properly positioned and prevent excess lateral displacement of the flexible cable 110. To the extent possible, extraneous motion of the flexible cable 110 should be controlled to ensure long term repeatable performance. To that end, in an alternative embodiment, a slightly modified cable guide channel 14A may extend a further distance from the leading end 18 of the cable guide 10, and terminating at a transition region 16A that is closer to the trailing end 20. In one embodiment, the guide channel 14A extends beyond a midline 58 of the cable guide 10 so that transition region 16A is closer to the trailing end 20 than it is to the leading end 18. In another embodiment, the guide channel 14A extends beyond a midline 58 of the cable guide 10 so that transition region 16A is located near, at, or beyond a peak 60 of the deflecting section 26. By extending the cable guide 14A in this manner, the flexible cable 110 may be constrained to stay within the cable guide 14A to provide additional control over unwanted lateral motion of the flexible cable 110 as the lever 114 moves between the dispensing and non-dispensing positions.

In an alternative embodiment, because lateral motion of the flexible cable 110 is constrained by cable blocks 54 or other external features, the cable guide 10 may be manufactured without any guide channel 14, 14A at all. Assuming that the cable guide can be inserted without causing any unnecessary binding or contact with other parts, including the ferrule or cable housing 116, then part costs may be reduced by eliminating the guide channel 14, 14A.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

For example, embodiments of the cable guide presented above have been described in the form of a thin sheet metal component. In alternative embodiments, the cable guide may be integrated as a feature molded within the internal stricture of the actuator. Thus, the cable guide may be molded, for example by injection molding, as a part of the actuator body. Alternatively, the cable guide may be made of materials other than sheet metal. The cable guide may be manufactured using a molding process of plastic materials such as, but not limited to PTFE, POM, Acetals, ABS, PVC, Polypropylene, or Polyethylene. Such plastics may be used as is or may be modified to include abrasion resistant coatings that can be applied with known application methods, including but not limited to spray, dip, deposition or other methods.

We claim:

1. A dispenser actuator for remotely operating a dispensing unit having a proportioner for combining and dispensing a plurality of liquids in a selected proportion and a valve for passing and cutting off at least one of said liquids, the actuator comprising:

- a dispensing tube having an inlet end and a discharge end, said tube adapted to be in liquid communication with the dispensing unit at the inlet end of the dispensing tube;
- an actuator disposed adjacent the discharge end of said dispensing tube;
- a flexible elongated member operably connected between the valve of the dispensing unit and the actuator such that the valve is opened and closed by manipulating the actuator adjacent the discharge end of the tube; and
- a guide for controlling a path of travel of the flexible elongated member as the actuator is manipulated to operate the valve in the dispensing unit, the guide positioned within the actuator and in physical contact with the flexible elongated member, the guide comprising:
  - a thin arched body extending upward from a leading edge to a peak and downward to a trailing edge;
  - a planar ramped section extending from the leading edge towards the peak of the arched body; and
  - an arcuate deflecting section extending from the end of the planar ramped section and terminating downward at the trailing edge, wherein the flexible elongated member slides over the arcuate deflecting section as the actuator is manipulated to operate the valve in the dispensing unit.

2. The dispenser actuator of claim 1 wherein the guide prevents the flexible elongated member from bending with a bend radius smaller than ten times a diameter of the flexible elongated member as the actuator is manipulated to operate the valve in the dispensing unit.

3. The dispenser actuator of claim 1 wherein the guide is fabricated from sheet metal.

4. The dispenser actuator of claim 3 wherein the guide further comprises an abrasion resistant coating.

5. The dispenser actuator of claim 1 wherein the guide has a thickness between about 0.2-0.4 mm.

6. The dispenser actuator of claim 1 wherein the arcuate deflecting section has a bend with a radius of curvature between about 20-25 mm.

7. The dispenser actuator of claim 1 wherein the flexible elongated member includes a cross section diameter and the arcuate deflecting section includes a bend with a radius of curvature that is at least five times the cross section diameter of the flexible elongated member.

8. The dispenser actuator of claim 1 wherein the guide further comprises a recessed channel forming a trench protruding below the planar ramped section in a direction opposite the peak, the channel beginning at the leading edge and extending towards but terminating before the trailing edge.

9. The dispenser actuator of claim 8 wherein the trench of the recessed channel protrudes about 1-2 mm below the planar ramped section.

10. The dispenser actuator of claim 8 wherein the flexible elongated member is disposed within a housing that is secured to the actuator, the recessed channel providing clearance between the housing and the guide.

11. The dispenser actuator of claim 8 wherein the channel terminates beyond a midline of the guide at a location that is closer to the trailing edge than to the leading edge.

* * * * *